US010749361B2

(12) United States Patent
Jeon

(10) Patent No.: US 10,749,361 B2
(45) Date of Patent: Aug. 18, 2020

(54) CASING-TYPE CHARGING MODULE WITH CASING ASSEMBLY AND BATTERY ASSEMBLY FOR CHARGING MOBILE DEVICE

(71) Applicant: Korea Electronics Technology Co., Ltd., Changwon-si, Gyeongsangnam-do (KR)

(72) Inventor: Jeong Hyeon Jeon, Changwon-si (KR)

(73) Assignee: Korea Electronics Technology Co., Ltd., Changwon-si (KR)

( * ) Notice: Subject to any disclaimer, the term of this patent is extended or adjusted under 35 U.S.C. 154(b) by 391 days.

(21) Appl. No.: 15/809,512

(22) Filed: Nov. 10, 2017

(65) Prior Publication Data

US 2019/0148958 A1 May 16, 2019

(51) Int. Cl.
*H01M 10/46* (2006.01)
*H02J 7/00* (2006.01)
*H02J 50/10* (2016.01)
*H02J 7/34* (2006.01)

(52) U.S. Cl.
CPC .......... *H02J 7/0044* (2013.01); *H02J 7/0045* (2013.01); *H02J 7/342* (2020.01); *H02J 50/10* (2016.02)

(58) Field of Classification Search
USPC ......................................... 320/107, 114, 115
See application file for complete search history.

(56) References Cited

U.S. PATENT DOCUMENTS

| 9,735,595 | B2* | 8/2017 | Colahan | H04M 1/185 |
| 10,218,828 | B2* | 2/2019 | Haymond | G06F 1/1635 |
| 2014/0168866 | A1* | 6/2014 | Armstrong | H05K 5/0021 361/679.01 |
| 2015/0194833 | A1* | 7/2015 | Fathollahi | H02J 7/342 320/114 |
| 2016/0043585 | A1* | 2/2016 | Zawadzki | H02J 7/0044 320/114 |
| 2016/0118861 | A1* | 4/2016 | Gabriel | H02J 7/32 320/114 |
| 2017/0026498 | A1* | 1/2017 | Goldfain | H02J 7/342 |
| 2018/0059758 | A1* | 3/2018 | Boatner | G06K 7/1098 |

FOREIGN PATENT DOCUMENTS

| KR | 10-1441677 B1 | 9/2014 |
| KR | 10-2017-0058842 A | 5/2017 |

* cited by examiner

*Primary Examiner* — Edward Tso
(74) *Attorney, Agent, or Firm* — Novick, Kim & Lee, PLLC; Jae Youn Kim

(57) ABSTRACT

Provided is a casing-type charging module for a mobile device including a casing assembly and a battery assembly. Particularly, the casing assembly may be stably coupled to the battery assembly even though a rear surface design of the mobile device is sufficiently exposed.

9 Claims, 14 Drawing Sheets

CASING-TYPE CHARGING MODULE WITH CASING ASSEMBLY AND BATTERY ASSEMBLY FOR CHARGING MOBILE DEVICE

BACKGROUND OF THE INVENTION

Field of the Invention

The present invention relates generally to a charging module for charging a mobile device. More particularly, the present invention relates to a casing-type charging module for charging a mobile device, wherein the casing-type charging module is not only used as a casing, but also charged via an auxiliary battery mounted additionally in a state that the mobile device is mounted on the casing, and may stably protect a rear surface of the mobile device even though the rear surface of the mobile device may be sufficiently viewed when the auxiliary battery is removed.

Description of the Related Art

In general, a mobile device such as a smart phone is a portable communication terminal that is not limited to a simple call function, but may be variously utilized by allowing various images or graphics to be displayed using a large-sized liquid crystal display.

Such a mobile device requires a large consumption of battery power due to the provision of images or graphics through a large-sized liquid crystal display as described above, whereby the battery consumption may be accelerated. To solve the above-described problem, various technologies, such as charging via an auxiliary battery while carrying the mobile device, have been developed in recent years.

However, with respect to a technique of charging the mobile device via the auxiliary battery while carrying it, since the auxiliary battery and the mobile device are separately provided from each other, there are disadvantages in that a separate charging cable must be additionally provided and it is inconvenient to grasp the auxiliary battery and the mobile device that are separated from each other at the same time.

Accordingly, a technique has recently been proposed to integrate the auxiliary battery into a casing of the mobile device, as filed by the applicant of the present invention, and with respect thereto, the technique is disclosed in Korean Patent No. 10-1441677 and Korean Patent Application Publication No. 10-2017-0058842.

However, since the above-described conventional techniques substantially have a structure that completely covers the rear surface of the mobile device, the rear surface design of the mobile device is not shown, thereby causing dissatisfaction of some users.

In other words, although the rear surface of the mobile device is recently designed such that it may best expose the characteristic of the mobile device, all the rear surface of the mobile device is covered by the auxiliary battery or the casing, resulting that user dissatisfaction may exist due to non-exposure of the rear surface design.

When the casing is made of a transparent material, there are disadvantages in that the auxiliary battery may not be stably coupled to the casing, the mobile device may not compliment a color of the mobile device, the casing of the transparent material is weak in strength, and it is not possible to protect against a flexural deformation of the mobile device.

The foregoing is intended merely to aid in the understanding of the background of the present invention, and is not intended to mean that the present invention falls within the purview of the related art that is already known to those skilled in the art.

DOCUMENTS OF RELATED ART (Patent Document 0001) Korean Patent No. 10-1441677
(Patent Document 0002) Korean Patent Publication No. 10-2017-0058842

SUMMARY OF THE INVENTION

The present invention has been made in order to solve the above-mentioned problems of the prior art, and it is an object of the present invention to provide a casing-type charging module for charging a mobile device, wherein the casing-type charging module is not only used as a casing, but also charged via an auxiliary battery mounted additionally in a state that the mobile device is mounted on the casing, and may stably protect a rear surface of the mobile device even though the rear surface of the mobile device may be sufficiently viewed when the auxiliary battery is removed.

In order to achieve the above object, according to one aspect of the present invention, there is provided a casing-type charging module for a mobile device, the charging module includes a casing assembly provided to surround an edge and a rear surface of the mobile device to protect the mobile device from an external environment and provided with a casing terminal electrically connected to the mobile device in a lower inner portion thereof, and a battery assembly detachably provided on a rear surface of the casing assembly and provided with a battery terminal electrically connected to the casing terminal of the casing assembly to provide a power supply to the mobile device, and the casing assembly includes a main casing surrounding upper, lower, and both-side edges of the mobile device and a back cover provided to block an inner space of the main casing and made of a transparent material.

Herein, the casing terminal of the assembly casing may include a mobile connector connected to the mobile device and a pogo pin connector electrically connected to the mobile connector via a circuit board and having a pogo pin inserted therein, and the pogo pin connected to the pogo pin connector may be provided in a front surface of the battery assembly.

Further, a connector support end may be provided to support a rear surface of the pogo pin connector in a lower inner surface of the main casing, and a plurality of connecting holes through which the pogo pins pass may be provided in the connector support end.

Further, the charging module may include a first positioning guide protrusion provided on a rear surface of the back cover to protrude along an upper circumference of the connector support end, and a first positioning guide recess is provided on a front surface of the battery assembly to allow the first positioning guide protrusion to be recessed therein.

Further, the charging module may include two edge support ends provided on opposite sides of an inner surface of the main casing to support two upper corners of a front surface of the battery assembly respectively.

Further, a mounting recess may be provided on a rear surface of the back cover to allow each of the connector support end and the two edge support ends to be recessed therein.

Further, a first insertion recess may be provided on each of opposite sides of a front surface of the connector support end and front surfaces of the two edge support ends to allow a portion of a first magnetic member to be inserted therein, a second insertion recess may be provided in the mounting recess of the rear surface of the back cover to allow the remaining portion of the first magnetic member to be inserted therein, and the battery assembly may be provided with a second magnetic member that is magnetically coupled to the first magnetic force member.

Further, a second positioning guide protrusion may protrude around the second insertion recess provided on the rear surface of the back cover, and a second positioning guide recess may be provided on the front surface of the battery assembly to allow the second positioning guide protrusion to be recessed therein.

Further, a coupling hole may be provided in each of mounting recesses of the back cover, and a coupling protrusion through which the coupling hole passes is provided on each of opposite sides of a front surface of the connector support end and front surfaces of the two edge support ends.

Further, the two edge support ends may be respectively provided in positions corresponding to two upper corners of the front surface of the battery assembly.

Further, the charging module may include a coupling recess provided on an inner rear surface of the battery assembly, and the coupling recess is provided with an anti-slip member 240 for preventing slipping.

As described above, according to the casing-type charging module for a mobile device according to the present invention, the rear surface design of the mobile device may be sufficiently viewed from the outside, thereby improving the satisfaction of the user when the battery assembly is removed from the casing assembly.

In addition, the casing assembly of the casing-type charging module for a mobile device according to the present invention is provided by allowing a portion for protecting the mobile device from external impact, a portion for protecting against scratches, and a portion for protecting against flexural deformation to be integrated, and the first magnetic member and the connector terminal may be assembled together due to only process for coupling the back cover to the impact absorbing bumper and the main casing, thereby facilitating an overall assembly process.

Particularly, with the casing-type charging module for a portable terminal according to the present invention, the first positioning guide protrusion and the second positioning guide protrusion for allowing the casing assembly and the battery assembly to be guided at a predefined position respectively are not a simply linear, but rounded along the circumferences of the edge support ends and at the connector support ends, thereby preventing positional deviation in all directions.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, a preferred embodiment of a casing-type charging module for a mobile device according to the present invention will be described with reference to FIGS. 1 to 12.

Figure 1:
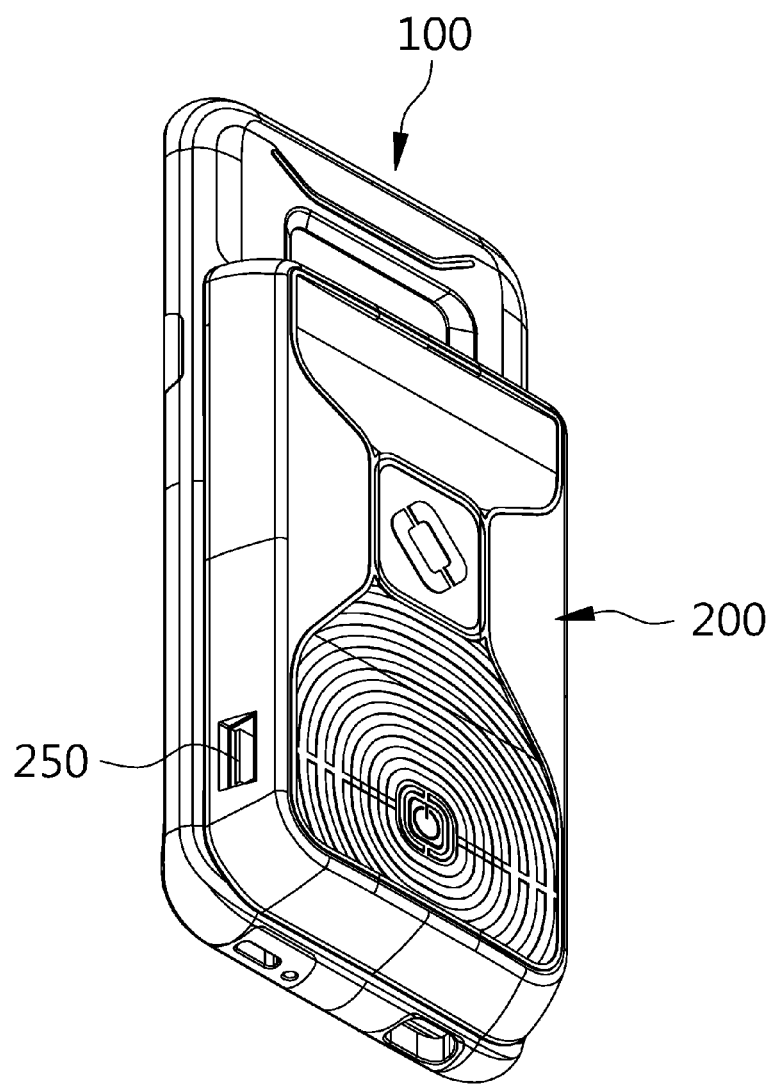
FIGS. 1 and 2 are perspective views of combined states viewed from directions different from each other to illustrate a casing-type charging module for a mobile device according to an embodiment of the present invention.
Figure 2:
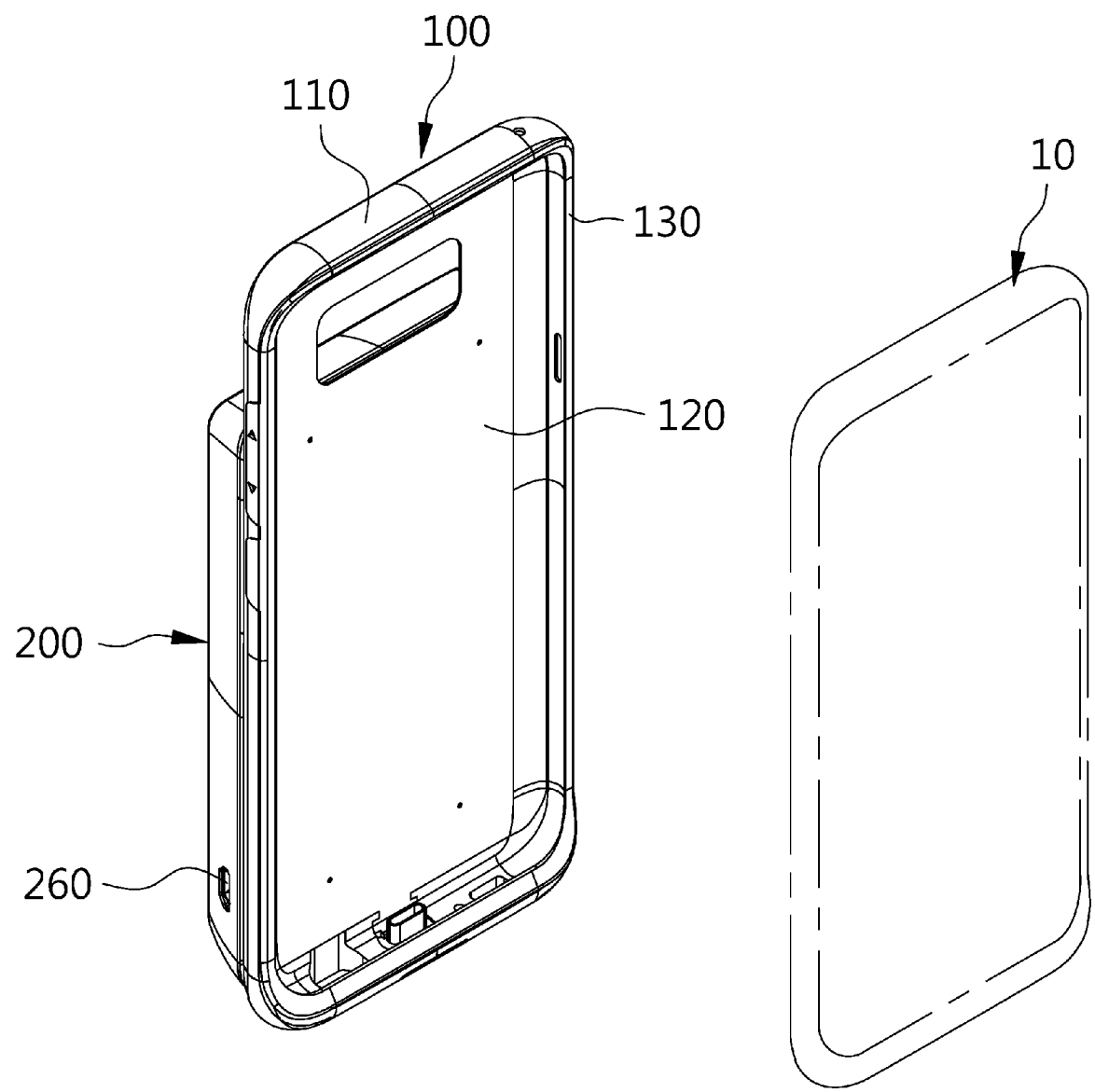
Figure 3:
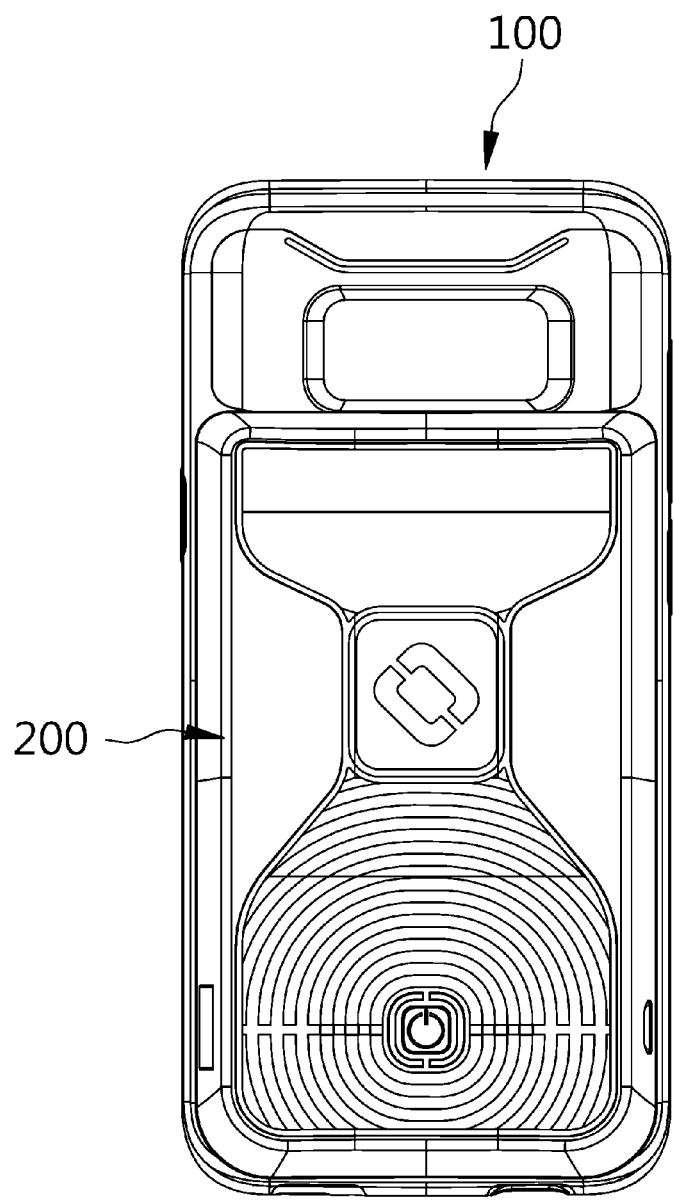
FIG. 3 is a rear view illustrating a casing-type charging module for a mobile device according to an embodiment of the present invention.
Figure 4:
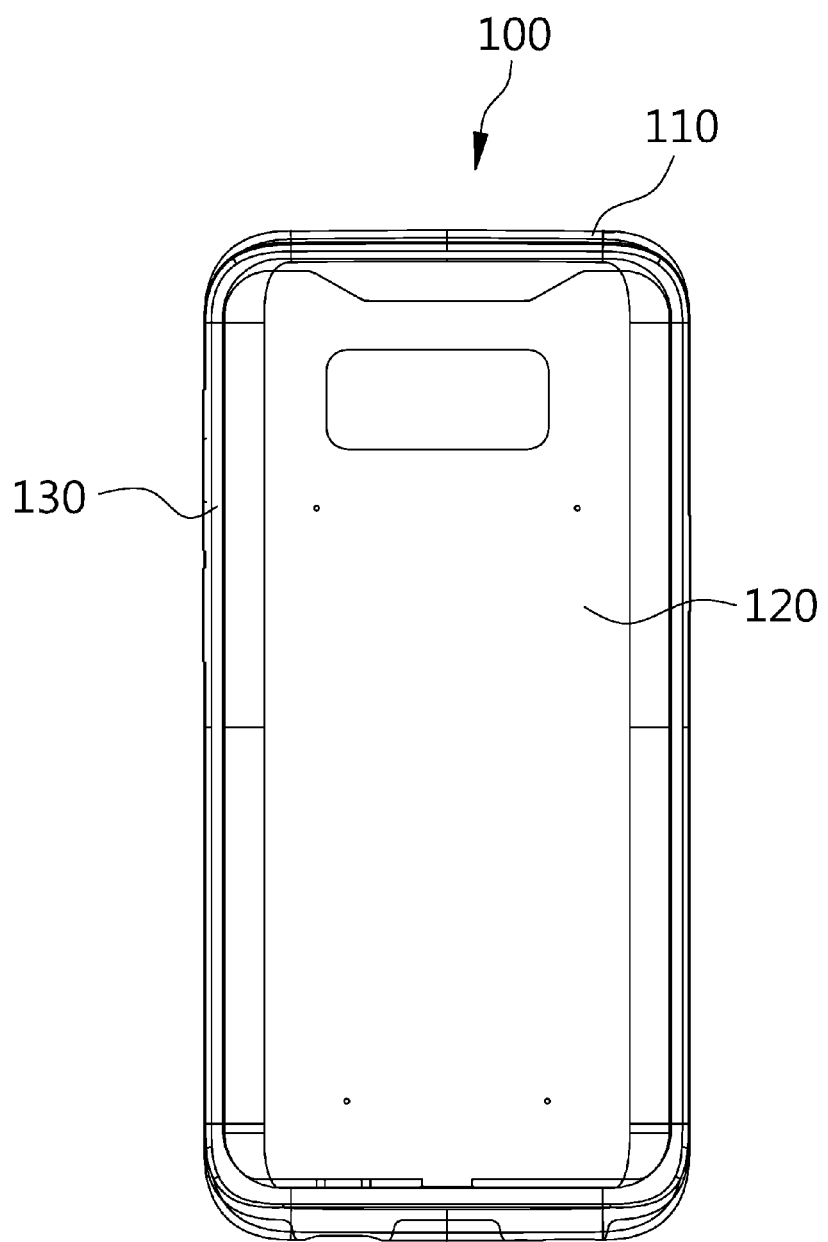
FIG. 4 is a front view illustrating a casing-type charging module for a mobile device according to an embodiment of the present invention.
Figure 5:
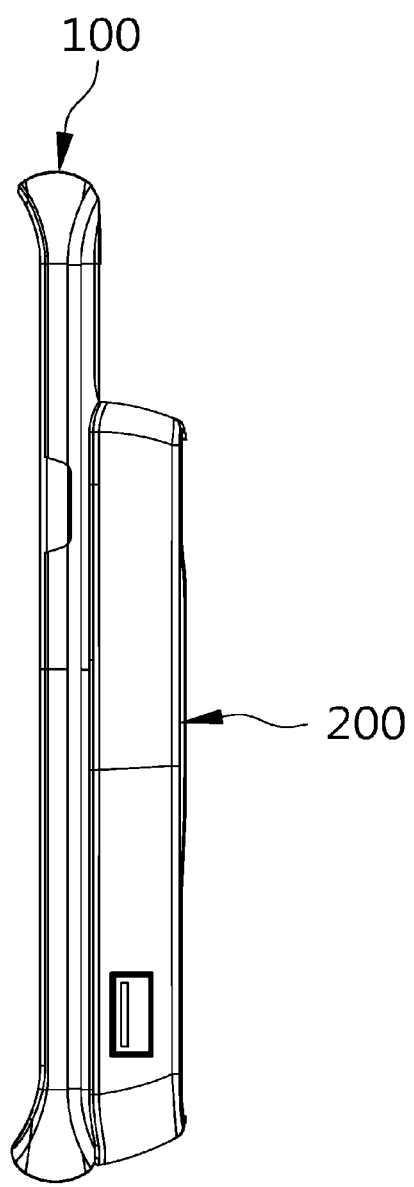
FIG. 5 is a side view illustrating a casing-type charging module for a mobile device according to an embodiment of the present invention.

FIGS. 1 and 2 are perspective views of combined state viewing from directions different from each other to illustrate a casing-type charging module for a mobile device according to an embodiment of the present invention, FIG. 3 is a rear view illustrating a casing-type charging module for a mobile device according to an embodiment of the present invention, FIG. 4 is a front view illustrating a casing-type charging module for a mobile device according to an embodiment of the present invention, and FIG. 5 is a side view illustrating a casing-type charging module for a mobile device according to an embodiment of the present invention.

As shown in these drawings, a casing-type charging module for a mobile device according to an embodiment of the present invention includes a casing assembly 100 and a battery assembly 200 as large components. Particularly, the casing assembly 100 is structured to be stably coupled to the battery assembly 200 while sufficiently exposing a rear surface design of the mobile device 10.

Hereinafter, it will be explained in more detail for each configuration.

First, the casing assembly 100 is provided to protect the mobile device 10 from the external environment.

The casing assembly 100 includes a main casing 110 and a back cover 120, and is provided to surround an edge and a rear surface of the mobile device 10.

The main casing 110 of the casing assembly 100 is provided to surround the edge of the mobile device 10 and is made of polycarbonate or a metal material to prevent the mobile device 10 from being deformed.

The main casing 110 includes an upper frame 111 of an upper portion, two side frames 112 of opposite sides, and a lower frame 113 of a lower portion, and four corners connecting each frame 111, 112, and 113 with one another are provided to be rounded.

Herein, a connector support end 114 is provided to extend from a lower inner surface of the main casing 110 (inner surface of the lower frame), and a plurality of connection holes 115 through which pogo pins pass are provided in the connector support end 114. At this time, opposite side portions of the connector support end 114 are gradually inclined inwards as it extends toward a top portion thereof, whereby opposite sides of the connector support end 114 and the two side frames 112 of the main casing 110 are separated from each other.

Two edge support ends 116 for supporting two upper corners of a front surface of the battery assembly 200 are provided to extend in a direction to block a front surface of the battery assembly 200 in both inner surfaces (inner surfaces of two side frames) of the main casing 110. In particular, when the battery assembly 200 is coupled to the casing assembly 100 such that two edge support ends 116 are respectively provided at positions corresponding to two upper corners of the front surface of the battery assembly 200, the battery assembly 200 may be stably supported on the main casing 110 by the support end 114 and two edge support ends 116.

In addition, an impact absorbing bumper 130 is preferably provided within the main casing 110. When the main casing 110 is impacted, the impact absorbing bumper 130 enables the mobile device 10 to be protected from the impact by absorbing the impact. The impact absorbing bumper is made of an impact-absorbable rubber material (e.g., urethane).

A seating recess 131 is provided in an inner edge portion of the front surface of the impact absorbing bumper 130. The seating recess 131 allows the back cover 120 to be seated therein as described later.

On the other hand, an upper support end 117 supporting the upper end of the mobile device 10 is provided to extend on the upper inner surface (the inner surface of the upper frame) of the main casing 110, whereby a rear surface of the mobile device 10 may be stably supported over whole portion.

The back cover 120 of the casing assembly 100 protects the rear surface of the mobile device 10 and is made of a transparent material (for example, acrylic) so that the rear surface design of the mobile device 10 may be exposed to the outside.

When the back cover 120 is mounted on an inner front surface of the main casing 110, the back cover 120 is provided to block an open inner space of the main casing 110. Preferably, the back cover 120 is pressed into the seating recess 131 of the impact absorbing bumper 130, whereby the back cover 120 may be fitted into the impact absorbing bumper 130 by the resilient restoring force of the impact absorbing bumper 130.

In addition, two mounting recesses 121, 122 in which the connector support end 114 and two edge support ends 116 of the main casing 110 are mounted to be recessed respectively, are provided on the rear surface of the back cover 120.

Further, a plurality of coupling holes 123 are provided in the back cover 120, and a plurality of coupling protrusions 118 coupled to each of the coupling holes 123 are provided in the main casing 110.

At this time, the coupling holes 123 are provided in each of the mounting recesses 121, 122 of the back cover 120, and the coupling protrusion 118 are provided on opposite sides of the front surface of the connector support end 114 and on the front surface of the two edge support ends 116, respectively. That is, the back cover 120 does not only maintain the coupling state by the elastic restoring force of the impact absorbing bumper 130, but also the coupling state may be more stably maintained by the additional coupling force using the coupling protrusion 118.

Figure 6:
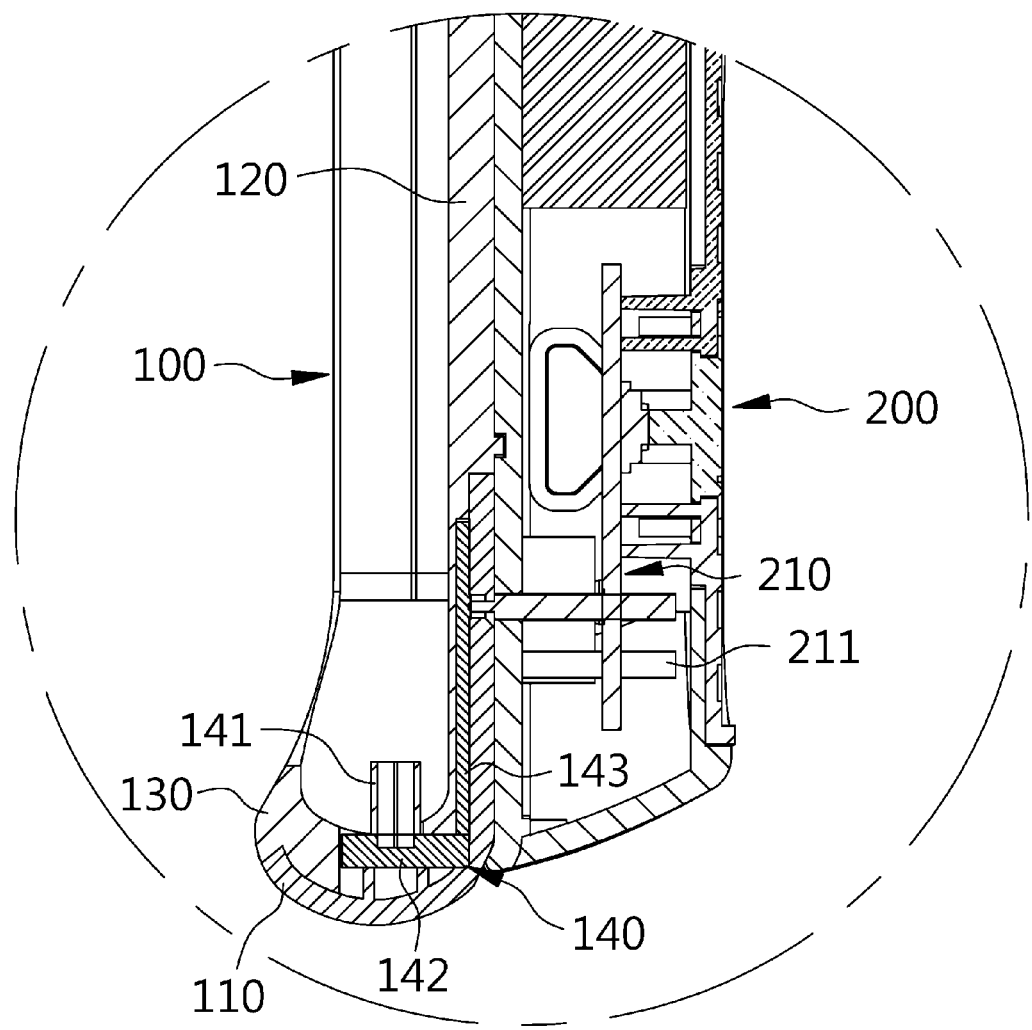
FIG. 6 is an enlarged sectional view of a main portion illustrating an installation structure of a casing terminal of a casing-type charging module for a mobile device according to an embodiment of the present invention.
Figure 8:
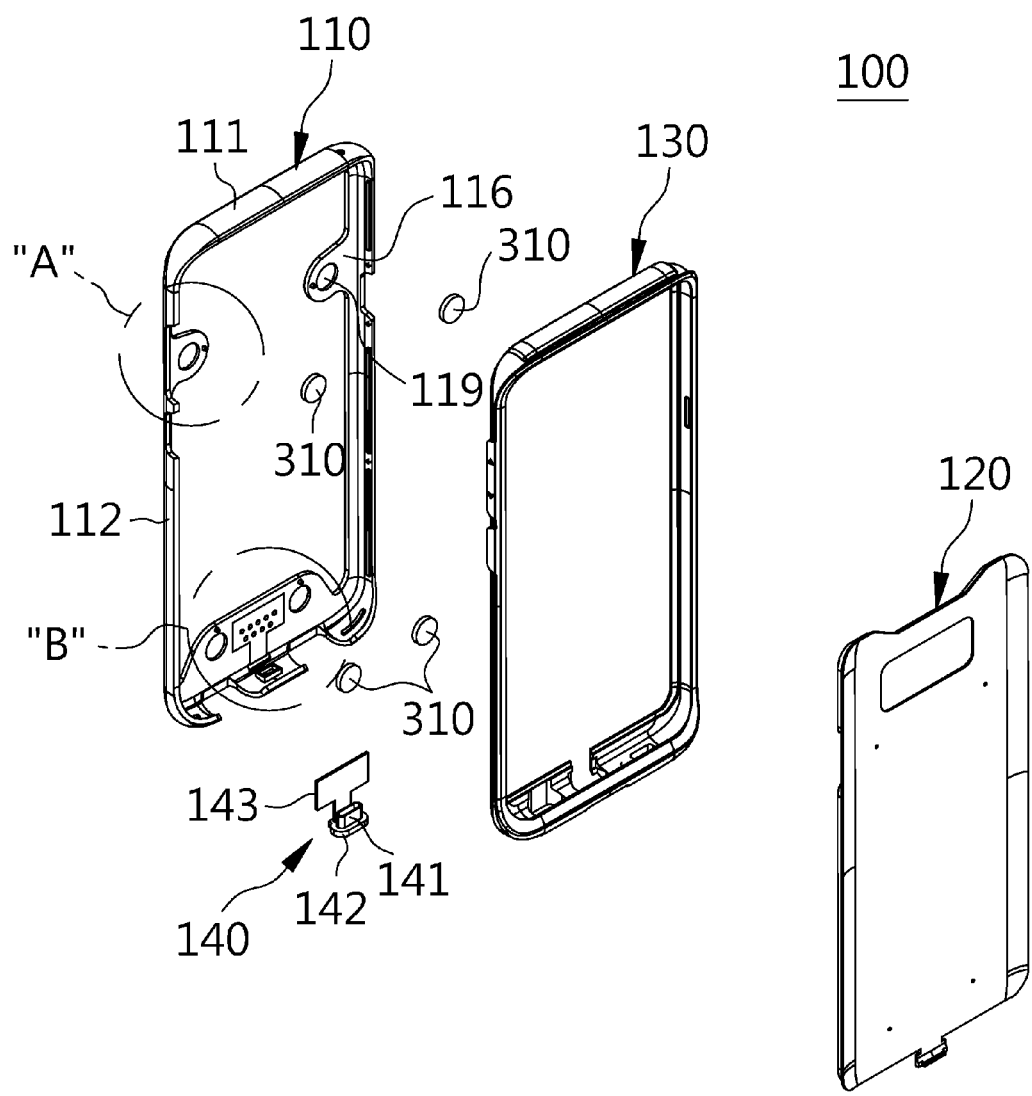
FIG. 8 is an exploded view illustrating a casing assembly of a casing-type charging module for a mobile device according to an embodiment of the present invention.

FIG. 6 is an enlarged sectional view of a main portion illustrating an installation structure of a casing terminal, and FIG. 8 is an exploded view illustrating a casing assembly of a casing-type charging module for a mobile device according to an embodiment of the present invention.

Referring to FIG. 6 and FIG. 8, a casing terminal 140 which is electrically connected to the mobile device 10, is provided in a lower inner side of the casing assembly 100.

The casing terminal 140 includes a mobile connector 141 connected to the mobile device 10 and a pogo pin connector 143 which is provided to be electrically connected to the mobile connector 141 through the circuit board 142 and into which a pogo pin is inserted. That is, the mobile device 10 incorporated in the casing assembly 100 is configured to be power-supplied from the battery assembly 200 through the casing terminal 140.

At this time, the pogo pin connector 143 is installed to be supported on the front surface of the connector support end 114.

In addition, a circuit board 142 connecting between the mobile connector 141 and the pogo pin connector 143 may be a general printed circuit board (PCB) or a flexibly deformable flexible PCB.

Next, the battery assembly 200 is a portable auxiliary battery having an electric condenser.

The battery assembly 200 includes a first connecting portion 250 (see FIG. 1) enabling a USB connector to be connected and a second connecting portion 260 (see FIG. 2) enabling a charging cable conneceter to be connected.

Particularly, the embodiment of the present invention allows the battery assembly 200 to be selectively coupled to the casing assembly 100 and a power supply or other electrical signal to be provided to the mobile device 10 on which the casing assembly 100 is mounted.

The battery assembly 200 is provided with a battery terminal 210 (referring to FIG. 14) that is detachably mounted on the rear surface of the casing assembly 100 and electrically connected to the casing terminal 140 of the casing assembly 100. At this time, the battery terminal 210 is provided with the pogo pin 211 connected to the pogo pin connector 143 in the casing terminal 140 of the casing assembly 100.

Figure 9:
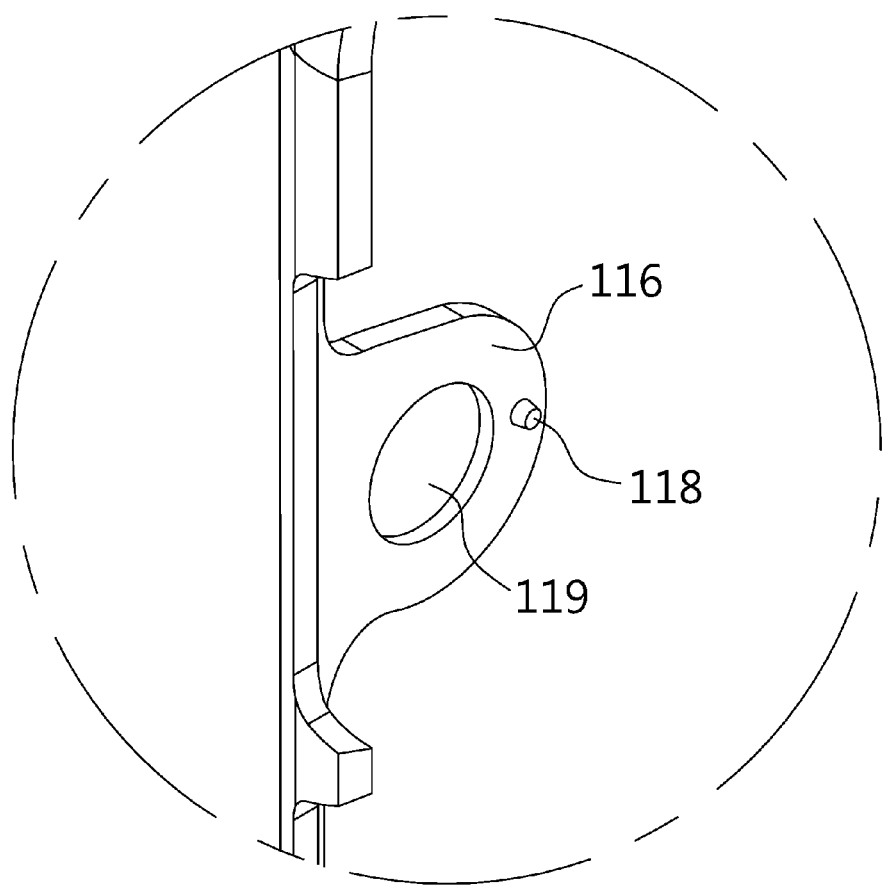
FIG. 9 is an enlarged view of "A" portion of FIG. 8.
Figure 10:
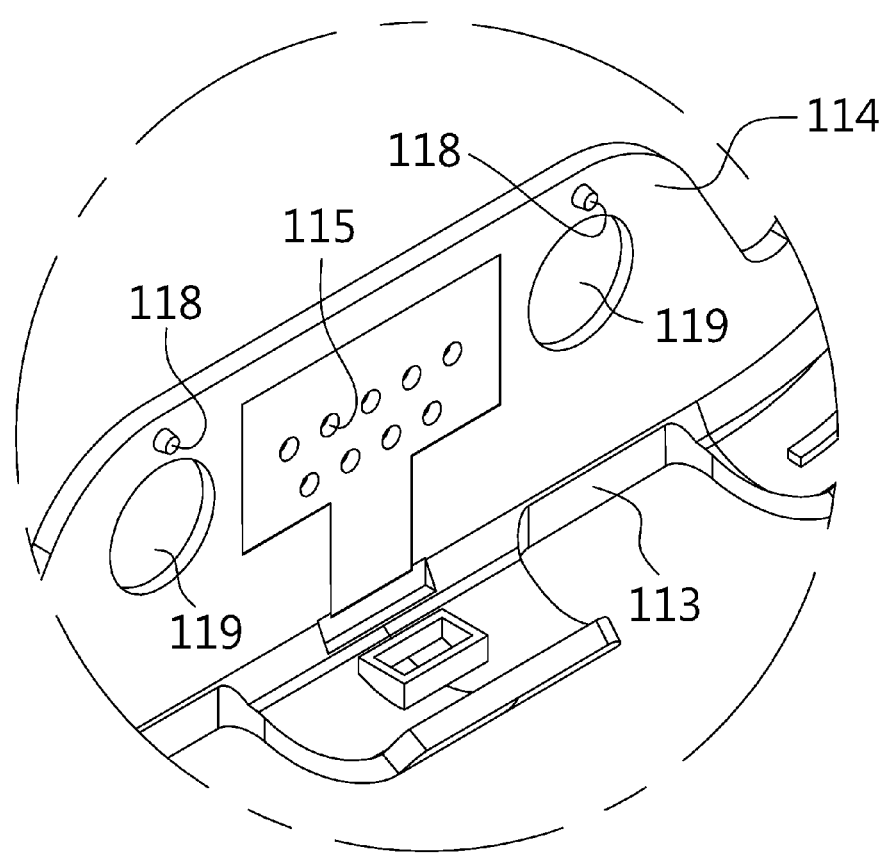
FIG. 10 is an enlarged view of "B" portion of FIG. 8.
Figure 11:
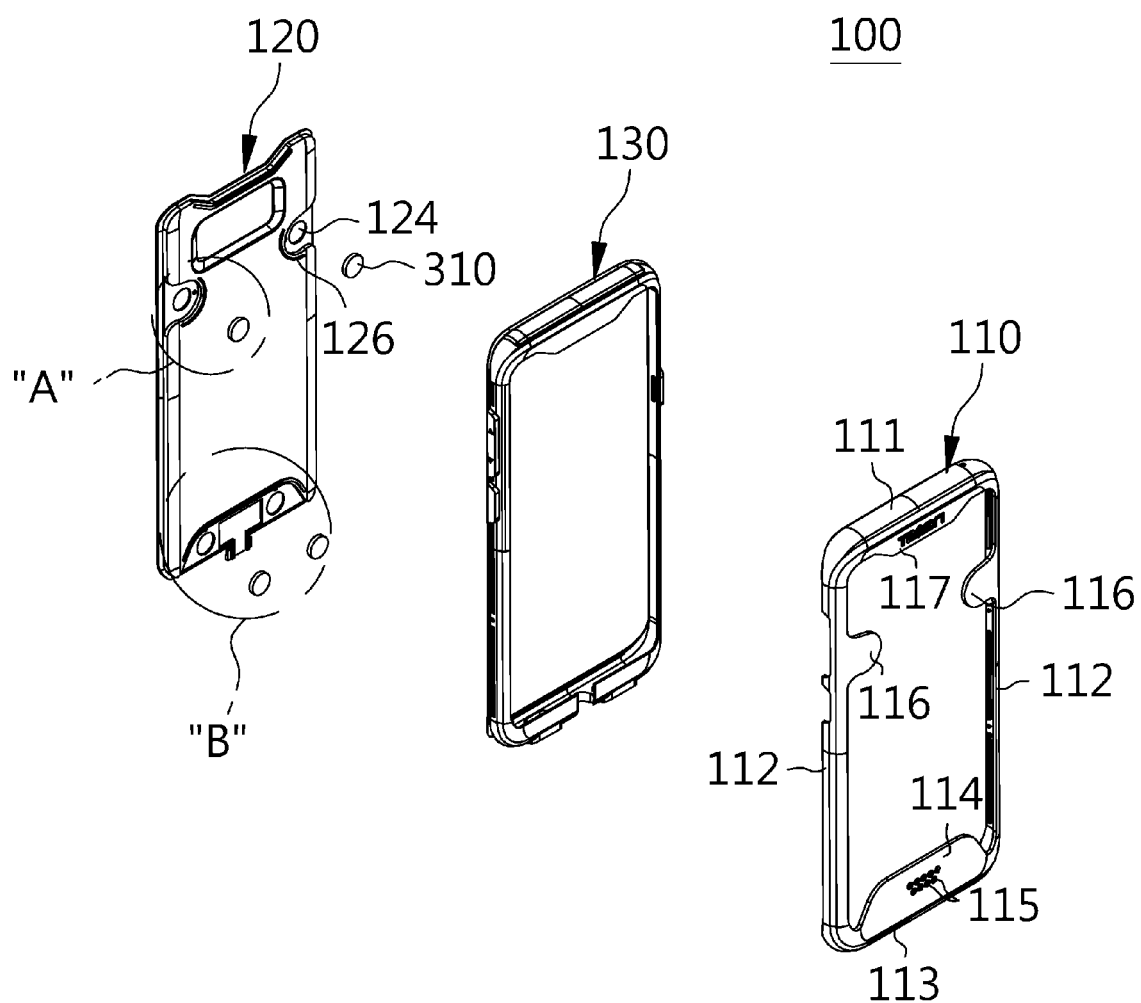
FIG. 11 is an exploded view illustrating a casing assembly of a casing-type charging module for a mobile device according to an embodiment of the present invention, which is viewed from a direction opposite from that of FIG. 8.

On the other hand, FIGS. 8 and 11 are exploded views illustrating a casing assembly of a casing-type charging module for a mobile device according to an embodiment of the present invention, which is viewed from directions opposite from each other. Meanwhile, FIGS. 9 and 10 are enlarged views of "A" and "B" portions of FIG. 8, FIGS. 12 and 13 are enlarged views of "A" and "B" portions of FIG. 11, and FIG. 14 is a perspective view illustrating a structure of a front surface of a battery assembly in a casing-type charging module for a mobile device according to an embodiment of the present invention.

Figure 12:
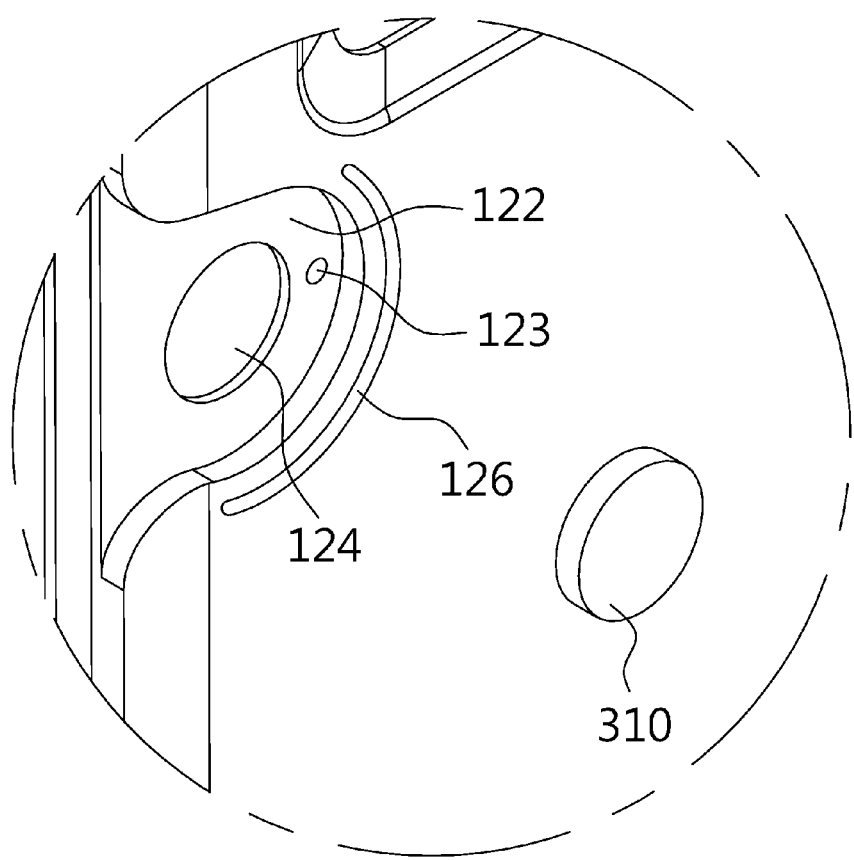
FIG. 12 is an enlarged view of "A" portion of FIG. 11.
Figure 13:
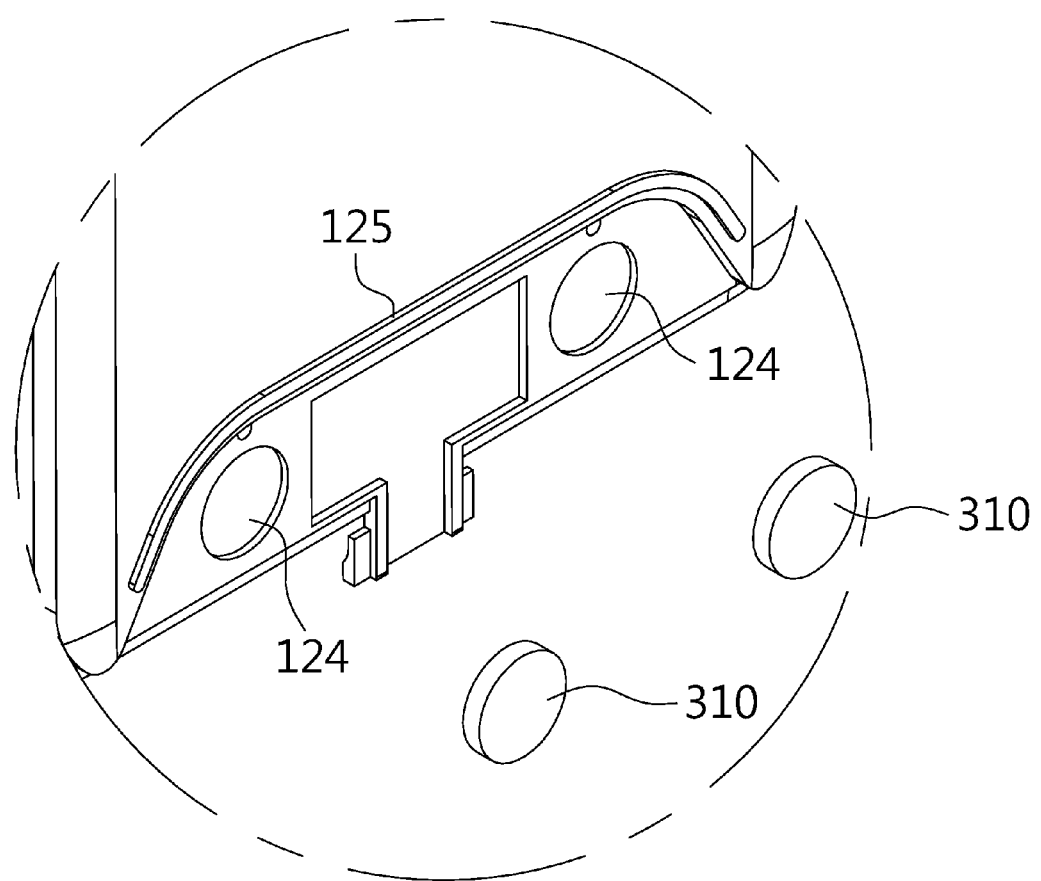
FIG. 13 is an enlarged view of "B" portion of FIG. 11.
Figure 14:
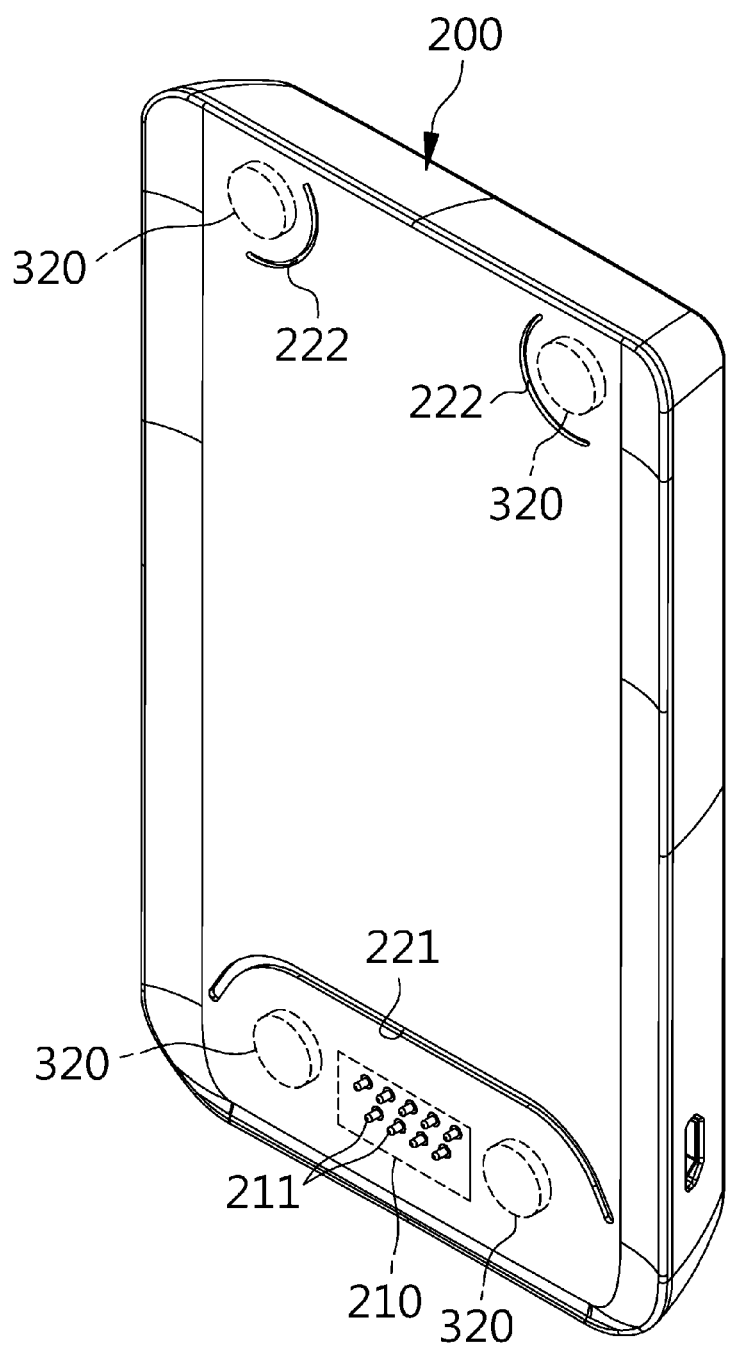
FIG. 14 is a perspective view illustrating a structure of a front surface for a battery assembly of a casing-type charging module for a mobile device according to an embodiment of the present invention.

According to this, a first insertion recess 119 is provided on each of opposite sides of a front surface of the connector support end 114 to allow a portion of a first magnetic member 310 to be inserted therein and a front surface of the two edge support ends 116, and a second insertion recess 124 is provided in each of the mounting recesses 121 and 122 on the rear surface of the back cover 120 to allow the remaining portion of the first magnetic member 310 to be inserted therein (referring to FIGS. 11 to 13). The battery assembly 200 is provided with a second magnetic member 320 (referring to FIG. 14) that is magnetically coupled to the first magnetic member 310.

That is, the battery assembly 200 may be easily coupled to the casing assembly 100 by the first magnetic member 310 and the second magnetic member 320 that are described above.

At this time, the first magnetic member 310 and the second magnetic member 320 may be made of magnets having poles opposite from each other; and any one of the first magnetic member 310 and the second magnetic member 320 may be magnet and the other may be made of a metal material that attaches to the magnet.

Particularly, since the magnetic force members 310 and 320 is located at portions where the terminals 140 and 210 of the casing assembly 100 and the battery assembly 200 are connected in two upper corners of the battery assembly 200 respectively, it is possible stably to maintain the connection between the battery assembly 200 and the casing assembly 100 while precisely performing the electric connection between the terminal 140 of the casing assembly 100 and the terminal 210 of the battery assembly 200.

A first positioning guide protrusion 125 is provided on the rear surface of the back cover 120 to protrude along an upper circumference portion of the connector support end 114, and a first positioning guide recess 220 is provided on the front surface of the battery assembly 200 to allow the first positioning guide protrusion 125 to be recessed therein. That is, the first positioning guide protrusion 125 and the first positioning guide recess 220 allow the battery assembly 200 to be coupled to the casing assembly 100 at a predefined position, thereby achieving precise connection between the terminal 140 and the terminal 210.

The second positioning guide protrusion 126 protrudes around the second insertion recess 124 provided on the rear surface of the back cover 120, and a second positioning guide recesses 222 is provided on the front surface of the battery assembly 200 to allow the second positioning guide protrusion 126 222 to be recessed therein. That is, the second positioning guide protrusion 126 and the second positioning guide recess 222 allow the two upper corners of the battery assembly 200 to be precisely seated on each of the edge support ends 116 of the casing assembly 100, whereby the battery assembly 200 and the casing assembly 100 may be connected robustly while performing the connection between the battery assembly 200 and the casing assembly 100 more precisely.

At this time, the first positioning guide protrusion 125 and the second positioning guide protrusion 126 are not provided to be simply linear, but rounded along a round portion formed by the circumference of each of the support ends 114 and 116, whereby it is possible to prevent positional deviation in both the vertical and horizontal directions, as well as to prevent positional deviation only in any one direction of vertical and horizontal directions.

Figure 7:
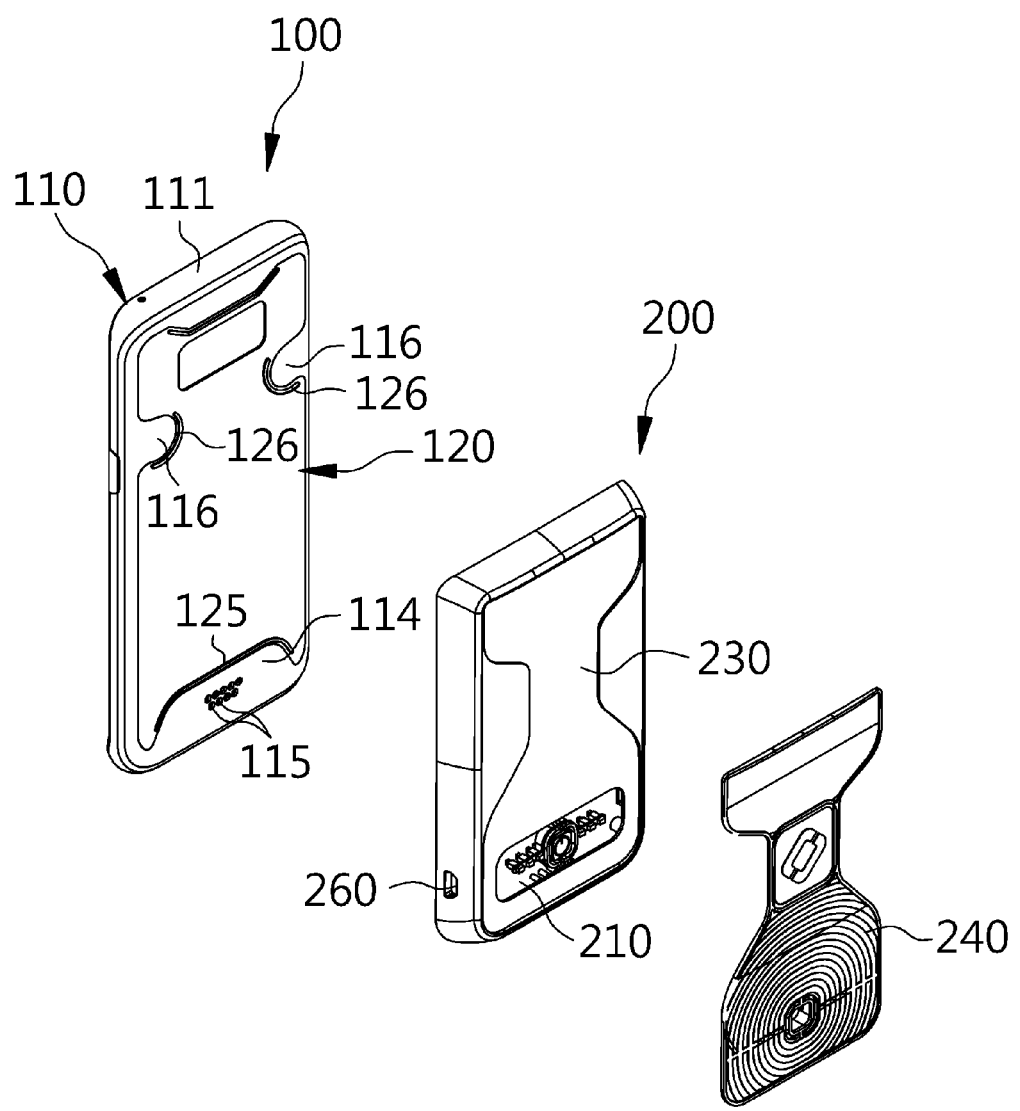
FIG. 7 is an exploded view of a casing-type charging module for a mobile device in which a casing assembly and a battery assembly are separated according to an embodiment of the present invention.

Further, FIG. 7 is an exploded view of a casing-type charging module for a mobile device in which a casing assembly and a battery assembly are separated according to an embodiment of the present invention.

As shown in FIG. 7, the battery assembly 200 has a coupling recess 230 provided on an inner rear surface thereof, and the coupling recess 230 is provided with an anti-slip member 240 for preventing slipping.

That is, when the battery assembly 200 is coupled to the casing assembly 100 and then the mobile device 10 is stored in the casing assembly 100, the anti-slip member 240 enables the battery assembly 200 to prevent slipping on the ground even if the rear surface of the battery assembly 200 is placed on the ground.

Hereinafter, a process for assembling the casing assembly 100 in the casing-type charging modules for the portable terminal will be described according to the embodiment of the present invention.

First, the main casing 110, the impact absorbing bumper 130, the back cover 120, and the casing terminal 140 constituting the casing assembly 100 are each prepared.

In this time, the impact absorbing bumper 130 is press-fitted in a front inner side of the main casing 110. Considering that the impact absorbing bumper 130 is made of a rubber material, the impact absorbing bumper 130 may be precisely brought into close contact with the inner surface of the main casing 110 due to its own restoring force when coupled to the main casing 110.

When the impact absorbing bumper 130 is coupled to the main casing 110, the mobile connector 141 of the casing terminal 140 is exposed through the bottom surface of the impact absorbing bumper 130, and the pogo pin connector 143 is brought into close contact with the rear surface of the connector support end 114.

Then, the back cover 120 is coupled to a front surface of the impact absorbing bumper 130 so that the pogo pin connector 143 is positioned between the back cover 120 and the main casing 110, thereby preventing the pogo pin connector 143 from deviating.

Particularly, when the back cover 120 is coupled to the impact absorbing bumper 130, the back cover 120 is press-fitted in the seating recess 131 of the impact absorbing bumper 130, and the coupling holes 123 provided on each of the mounting recesses 121 and 122 are coupled to the coupling protrusion 118 provided on each of the both front sides of the connector support end 114 and the front sides of the two edge support ends 116.

At this time, since the connector support end 114 and two edge support ends 116 of the main casing 110 are mounted to be recessed in each of the mounting recesses 121 and 122 of the back cover 120, a height of the rear surface of the back cover 120 coincides with that of the rear surface of the main casing 110 when the back cover 120 is coupled to the main casing 110.

When the casing assembly 100 is completed through the above-described process and then the mobile device 10 is incorporated in the casing assembly 100, all edges and rear surfaces of the mobile device 10 are protected from shocks or scratches from the external environment.

In particular, since the back cover 120 is made of a transparent material, the rear surface design of the mobile device 10 may be exposed, and two edge support ends 116 and the connector support end 114 of the main casing 110 support the rear surface of the back cover 20, it is possible to prevent the back cover 120 from being removed from the main casing 110 although the back cover 120 is bent outwards the main casing 110.

In other words, when the battery assembly 200 is brought into close contact with the rear surface of the casing assembly 100, each of the pogo pins 211 provided in the battery terminal end 210 of the battery assembly 200 passes through the connection holes 115 provided in the connector support end 114 and then is connected to the pogo pin connector 143.

When the battery assembly 200 is brought into close contact with the rear surface of the casing assembly 10, the first magnetic member 310 and the second magnetic member 320 of the battery assembly 200 and the casing assembly 100 are attracted to each other, thereby holding two assemblies 100 and 200 firmly.

Particularly, the first positioning guide protrusion 125 and the second positioning guide protrusion 126 provided on the back cover 120 of the casing assembly 100 are recessed in a first positioning guide recess 221 and the second positioning guide recess 222 provided on the front surface of the battery assembly 200, whereby two assemblies are integrated at a predefined position and the pogo pin 211 of the battery terminal end 210 may be precisely connected to the pogo pin connector 143.

Consequently, with the casing-type charging module for the mobile device according to the present invention, the rear surface design of the mobile device may be sufficiently viewed from the outside, thereby improving the satisfaction of a user when the battery assembly 200 is removed from the casing assembly 100.

In addition, the casing assembly of the casing-type charging module for a mobile device according to the present invention is provided by allowing a portion for protecting the mobile device 10 from external impact, a portion for protecting against scratches, and a portion for protecting against flexural deformation to be integrated, the first magnetic member 310 and the connector terminal 140 may be assembled together due to only process for coupling the back cover 120 to the impact absorbing bumper 130 and the main casing 110, thereby facilitating overall an assembling process.

Particularly, with the casing-type charging module for a portable terminal according to the present invention, the first positioning guide protrusion 125 and the second positioning guide protrusion 126 for allowing the casing assembly 100 and the battery assembly 200 to be guided at a predefined position respectively are not simply linear, but rounded along the circumferences of the edge support ends 116 and the connector support ends 114, thereby preventing positional deviation in all directions.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A casing-type charging module for a mobile device, the charging module comprising:
   a casing assembly provided to surround an edge and a rear surface of the mobile device to protect the mobile device from an external environment and provided with a casing terminal electrically connectable to the mobile device in a lower inner portion thereof; and
   a battery assembly detachably provided on a rear surface of the casing assembly and provided with a battery terminal electrically connectable to the casing terminal of the casing assembly to provide a power supply to the mobile device,
   wherein the casing assembly includes a main casing for surrounding upper, lower, and both-side edges of the mobile device and a back cover provided to block an inner space of the main casing and made of a transparent material,
   wherein the casing terminal of the casing assembly includes a mobile connector connectable to the mobile device and a pogo pin connector electrically connectable to the mobile connector via a circuit board and having a pogo pin inserted therein; and
   the pogo pin connected to the pogo pin connector is provided in a front surface of the battery assembly,
   wherein a connector support end is provided to support a rear surface of the pogo pin connector in a lower inner surface of the main casing; and
   a plurality of connecting holes through which the pogo pin passes is provided in the connector support end.

2. The casing-type charging module of claim 1, further comprising a first positioning guide protrusion provided on a rear surface of the back cover to protrude along an upper circumference of the connector support end,
   wherein a first positioning guide recess is provided on a front surface of the battery assembly to allow the first positioning guide protrusion to be recessed therein.

3. The casing-type charging module of claim 1, further comprising two edge support ends provided on opposite sides of an inner surface of the main casing to support two upper corners of a front surface of the battery assembly respectively.

4. The casing-type charging module of claim 3, wherein a mounting recess is provided on a rear surface of the back cover to allow each of the connector support end and the two edge support ends to be recessed therein.

5. The casing-type charging module of claim 4, wherein a first insertion recess is provided on each of opposite sides of a front surface of the connector support end and front surfaces of the two edge support ends to allow a portion of a first magnetic member to be inserted therein;
   a second insertion recess is provided in the mounting recess of the rear surface of the back cover to allow the remaining portion of the first magnetic member to be inserted therein; and
   the battery assembly is provided with a second magnetic member that is magnetically coupled to the first magnetic force member.

6. The casing-type charging module of claim 5, wherein a second positioning guide protrusion protrudes around the second insertion recess provided on the rear surface of the back cover; and
   a second positioning guide recess is provided on the front surface of the battery assembly to allow the second positioning guide protrusion to be recessed therein.

7. The casing-type charging module of claim 3, wherein a coupling hole is provided in each of mounting recesses of the back cover, and a coupling protrusion through which the coupling hole passes is provided on each of opposite sides of a front surface of the connector support end and front surfaces of the two edge support ends.

8. The casing-type charging module of claim 3, wherein the two edge support ends are respectively provided in positions corresponding to two upper corners of the front surface of the battery assembly.

9. The casing-type charging module of claim 1, further comprising a coupling recess provided on an inner rear surface of the battery assembly,
   wherein the coupling recess is provided with an anti-slip member for preventing slipping.

* * * * *